United States Patent
Finnerty et al.

(10) Patent No.: US 7,252,222 B2
(45) Date of Patent: Aug. 7, 2007

(54) EMBEDDED OPTICAL SIGNATURES IN DOCUMENTS

(75) Inventors: Fred W. Finnerty, Dawsonville, GA (US); Gary R. Streeter, Andover, MA (US); Kenneth E. Irwin, Jr., Dawsonville, GA (US)

(73) Assignee: Scientific Game Royalty Corporation, Newark, DE (US)

( * ) Notice: Subject to any disclaimer, the term of this patent is extended or adjusted under 35 U.S.C. 154(b) by 155 days.

(21) Appl. No.: 11/014,159

(22) Filed: Dec. 16, 2004

(65) Prior Publication Data

US 2005/0133584 A1    Jun. 23, 2005

Related U.S. Application Data

(60) Provisional application No. 60/531,179, filed on Dec. 19, 2003.

(51) Int. Cl.
    *G06F 17/00*   (2006.01)
(52) U.S. Cl. .................. 235/375; 235/454; 235/494
(58) Field of Classification Search ............. 235/375, 235/378–379, 381, 449, 454, 468, 493, 494; 283/93–94, 901–903
See application file for complete search history.

(56) References Cited

U.S. PATENT DOCUMENTS

| | | | | |
|---|---|---|---|---|
| 4,998,010 A | * | 3/1991 | Chandler et al. | 235/494 |
| 5,189,292 A | * | 2/1993 | Batterman et al. | 235/494 |
| 5,420,406 A | * | 5/1995 | Izawa et al. | 235/379 |
| 5,471,039 A | | 11/1995 | Irwin, Jr. et al. | |
| 5,475,205 A | | 12/1995 | Behm et al. | |
| 5,548,110 A | * | 8/1996 | Storch et al. | 235/462.07 |
| 5,588,069 A | * | 12/1996 | Katayama et al. | 382/166 |
| 5,591,956 A | * | 1/1997 | Longacre et al. | 235/462.1 |
| 5,599,046 A | | 2/1997 | Behm et al. | |
| 5,621,200 A | | 4/1997 | Irwin, Jr. et al. | |
| 5,667,250 A | * | 9/1997 | Behm et al. | 283/102 |
| 5,769,458 A | * | 6/1998 | Carides et al. | 283/102 |
| 5,791,990 A | * | 8/1998 | Schroeder et al. | 463/17 |
| 5,818,019 A | | 10/1998 | Irwin, Jr. et al. | |
| 5,863,075 A | * | 1/1999 | Rich et al. | 283/94 |
| 5,997,044 A | | 12/1999 | Behm et al. | |
| 6,053,405 A | | 4/2000 | Irwin, Jr. et al. | |
| 6,107,913 A | * | 8/2000 | Gatto et al. | 340/323 R |
| 6,330,976 B1 | * | 12/2001 | Dymetman et al. | 235/487 |
| 6,379,742 B1 | | 4/2002 | Behm et al. | |
| 6,435,408 B1 | | 8/2002 | Irwin, Jr. et al. | |
| 6,491,215 B1 | | 12/2002 | Irwin, Jr. et al. | |
| 6,533,182 B1 | * | 3/2003 | Ohshima et al. | 235/494 |
| 6,552,290 B1 | * | 4/2003 | Lawandy | 209/576 |
| 6,601,772 B1 | * | 8/2003 | Rubin et al. | 235/494 |
| 6,676,126 B1 | * | 1/2004 | Walker et al. | 273/139 |

(Continued)

*Primary Examiner*—Thien M. Le
*Assistant Examiner*—Edwyn Labaze
(74) *Attorney, Agent, or Firm*—Carlton Fields PA

(57) ABSTRACT

A method of embedding an optical signature in a document and document produced therefrom. The optical signature is an optical pattern generated from a known value, such as a mathematical, geometric, trigonometric, size, phase, and the like, and the same value can be generated from examination of a document having the embedded optical pattern. The document can be validated, authenticated, or the determination of a valid copy of an original document with the embedded optical signature made through comparison of the known value and the value generated from the optical pattern on the document. The optical pattern can also be generated from other identification codes on the document.

6 Claims, 6 Drawing Sheets

U.S. PATENT DOCUMENTS

| | | |
|---|---|---|
| 6,776,337 B2 | 8/2004 | Irwin, Jr. et al. |
| 6,875,105 B1 * | 4/2005 | Behm et al. .................. 463/17 |
| 6,898,288 B2 * | 5/2005 | Chui ......................... 380/278 |
| 6,899,621 B2 * | 5/2005 | Behm et al. .................. 463/17 |
| 6,929,186 B2 * | 8/2005 | Lapstun ...................... 235/494 |
| 2002/0084327 A1 * | 7/2002 | Ehrhart et al. .............. 235/454 |
| 2002/0084335 A1 * | 7/2002 | Ericson ...................... 235/494 |
| 2002/0136459 A1 * | 9/2002 | Imagawa et al. ........... 382/218 |
| 2004/0026508 A1 * | 2/2004 | Nakajima et al. ........... 235/454 |
| 2004/0076310 A1 * | 4/2004 | Hersch et al. .............. 382/100 |
| 2004/0124243 A1 * | 7/2004 | Gatto et al. ................. 235/487 |
| 2004/0127279 A1 * | 7/2004 | Gatto et al. ................... 463/17 |
| 2005/0038756 A1 * | 2/2005 | Nagel .......................... 705/76 |
| 2005/0135656 A1 * | 6/2005 | Alattar et al. ............... 382/100 |
| 2005/0173533 A1 * | 8/2005 | Pettersson ................... 235/454 |

\* cited by examiner

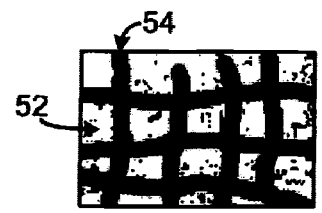
Fig. 2E       Fig. 2F
Fig. 3
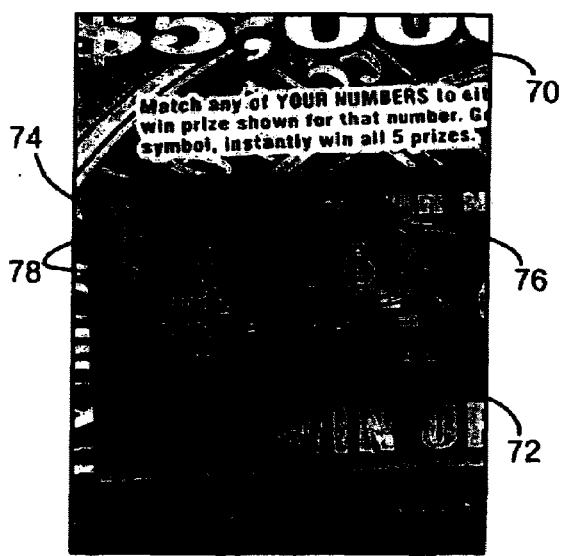
Fig. 4

EMBEDDED OPTICAL SIGNATURES IN DOCUMENTS

CROSS-REFERENCE TO RELATED APPLICATION

This application claims the benefit of U.S. Provisional Patent Application Ser. No. 60/531,179, entitled "Embedded Optical Signatures," filed on Dec. 19, 2003, the entirety of which is hereby incorporated by this reference.

BACKGROUND OF THE INVENTION

1. Field of the Invention

The present invention generally relates to systems and methods of document validation and authentication. More particularly, the present invention relates to the use of embedded optical signatures in documents primarily for the purposes of authentication, validation, and copy verification.

2. Description of the Related Art

There are several methods known to embed security measures into a document to help prove that the document is authentic. The most basic methods are to impose or emboss a visible seal on the document. It is also known to use a watermark or a ribbon in the substrate of the document, or use color shifting ink, all of which are readily visible to a person viewing the document. There are other methods to maintain document authenticity which are not readily visible to a viewer, such as microprinting, or the use of heat (or light) sensitive ink.

One particularly important area for document authentication concerns lottery tickets. In most instances, mere possession of a winning lottery ticket entitles the holder to the winnings. Thus, authentication of the presented lottery ticket is critically important. For example, lottery on-line tickets which are common in many countries and states are, by necessity, printed and presented to the purchaser in real-time with transactional data printed on the lottery ticket via a thermal or impact printer. To enhance security, lotteries typically use preprinted ticket stock with serial numbering on the back of the printing substrate as well as fluorescent and other inks on the ticket substrate to help prove authenticity and integrity. The preprinted serial numbering provides much of the security in determining the authenticity of a winning ticket because the distribution of the preprinted serial number ticket stock is maintained by an entity separate from the one controlling the printing of transactional data. When a winning ticket is presented for redemption, an audit trail can be established between the ticket stock serial number and the transactional data. However, this added paper stock security has the disadvantage of high cost, as well as the logistics of tracking the ticket stock. Also, the labor intensive nature of correlating the ticket stock to an on-line lottery ticket printed at a given retailer at a given time typically prohibits the method's use for all but high-tier winning tickets. Moreover, existing commercial barcodes and serial numbers only cover a portion of the ticket and are relatively easy to remove and replace.

Another problem is that it is essential for an on-line lottery ticket to be proven both to exhibit authenticity (i.e., proof that it was created by the lottery system at the appropriate time) and integrity (i.e., that the ticket has not been modified by the player—it is in its original unmodified condition). Preprinted ticket stock and associated commercial barcodes simply prove that a ticket was printed at a given retailer during a given time period. Also, mere proof of authenticity does not address the problem of an insider with knowledge of the winning ticket's number after a drawing simply acquiring ticket stock from the retailer and printing a fraudulent winning ticket indicia. The concept of authenticity is also important to the lottery customer as the customer is also protected from the lottery authority falsely denying that the ticket is authentic.

Document authentication and integrity are particularly difficult with lottery "scratch-off" tickets. The scratch-off ticket has an array of playing indicia covered with a removable covering, typically a layer of latex, and the player removes the scratch-off layer to determine if the ticket contains winning indicia. The system to validate the winning scratch-off ticket must determine if the scratch-off media has been substantially removed prior to awarding a prize. This step is necessary to ensure that the scratch-off ticket cannot be prescreened by the ticket retailers with only non-winning tickets sold to the general public; i.e., a ticket with a substantial amount of its scratch-off layer removed cannot be sold as a virgin (un-played) ticket. Traditionally, this validation of removal of scratch-off layer was accomplished by requiring the retailer to enter coded information that was previously hidden under the scratch-off layer. However, this process was labor intensive and time consuming for the retailer. Often, the player does not remove the portion of the scratch-off layer covering the coded information as the revealing of the coded information is not of any value to the player. Furthermore, sometimes the area over the coded information is marked to prevent the player from scratching off the layer and attempting to alter the code.

One method that attempted to allow authentication, integrity, and validation of scratch-off lottery tickets is through hiding a two-dimensional barcode under the ticket's scratch-off medium that can easily be scanned with the proper equipment. However, the equipment required to scan the two dimensional bar code can be expensive. Moreover, the hiding of a two-dimensional barcode under the ticket's scratch-off medium results in the same labor intensive problem for the retailer as players tend to not scratch-off the area of the latex covering the two-dimensional barcode because it is of no interest. A further method of authentication, integrity, and validation of scratch-off lottery tickets is to electrically scan the ticket for the presence of electrical signatures in the scratch-off printing ink as well as the ticket's substrate. However, this methodology also requires expensive equipment.

Accordingly, it would be advantageous to provide a method for document validation embedded on the substrate of the document that is visible to equipment viewing the document and does not require a large surface area of view in order to provide the information requisite to validate or authenticate the document. Such method would be particularly well suited for use under the scratch-off layer in the validation of scratch-off lottery tickets as well as authenticating on-line tickets. It is to such a method of document security and authentication that the present invention is primarily directed.

SUMMARY OF THE INVENTION

Briefly described, the present invention is a method of embedding an optical signature in a document as either an identifying signature or as steganography data. The optical signature is an optical pattern that is generated from and represents a known mathematical value embodied as printed geometric relationships on the documents, and the same mathematical value can be generated from examination of the embedded optical pattern on a document. Other data, such as cryptographic keys, may be required to generate the same mathematical value after examining the embedded pattern. The document can thus be validated, authenticated, or the determination of a valid copy of an original document with the embedded optical signature made through comparison of the known mathematical value and the mathematical value generated from the optical pattern on the document. The optical pattern can also be generated from other identification codes on the document, such as universal product codes (UPC) or other bar codes, as could be present on lottery tickets. Moreover, the optical pattern can, in itself, carry extensive data which is not necessarily related to or cannot be created from other sources of data already on the ticket. Two exemplary optical patterns include Benday patterns and "star fields."

In one aspect, the invention is a method of validating a document having an embedded optical signature including the steps of examining an optical pattern that is embedded on the document, where the optical pattern encodes a stored mathematical or other value such as alpha, pattern, geometric, trigonometric, size, phase or other variable. Then generating a value from the optical pattern on the document, retrieving a stored value, and comparing the stored value with the generated value from the optical pattern on the document to then determine if the values are the same thereby indicating the document is valid/authentic. The invention also includes a document with a substrate having a detectable optical pattern embedded on the substrate where the optical pattern encodes a value.

The invention therefore provides an industrial advantage in that it is a method for document validation embedded on the substrate of the document that is visible to equipment, and does not necessarily have to be visible to a person, which can be used to verify the authenticity of a printed document, such as a lottery ticket. The present method does not require a large surface area of view in order to provide the information requisite to validate or authenticate the document, which is particularly useful as a validating pattern under the scratch-off layer of scratch-off lottery tickets. In addition to scratch-off Lottery tickets, the present invention can be used to ensure the authenticity of other documents, as well as placed in a document to prove or authenticate a copy of an original document.

Other objects, features, and advantages of the present invention will become apparent after review of the hereinafter set forth Brief Description of the Drawings, Detailed Description of the Invention, and the claims.

BRIEF DESCRIPTION OF THE DRAWINGS

FIG. 2E illustrates a mask that can be extracted from the lottery ticket's validating device memory and used to only allow a certain area of the relevant image to be displayed.

FIG. 2F illustrates a one-to-one relationship between the scanned Benday pattern pixels and the mask pixels with the scanned image oriented the same way as the digital mask so that they are overlaid.

FIG. 3 is a star field which can be used as the pattern creating an optical signature.

FIG. 4 is a scratch-off ticket with the scratch-off layer partially removed revealing an embedded star field thereunder.

DETAILED DESCRIPTION OF THE INVENTION

Figure 2A:
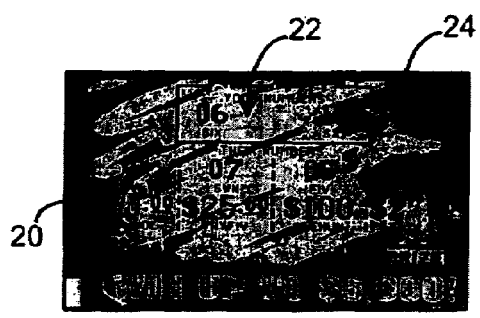
FIG. 2A is an example of a scratch-off lottery ticket with a Benday pattern printed on the document under the scratch-off layer.

The present invention provides a method of embedding an optical signature into a document requiring authentication or verification, such as the scratch-off lottery ticket 20 in FIG. 2A. In essence, a detectable optical pattern is embedded on the substrate of the document. The optical pattern encodes a mathematical value that can be reliably reproduced upon proper observation. Two examples of such optical patterns are Benday patterns and star-fields. The optical signature can be embedded over a large area of the document and viewing only a small portion of the pattern can provide enough of the signature to allow validation. The optical signature preferably does not interfere with the actual image on the document.

A Benday process is a method for adding tone or shading in drawings or pictures by the overlay of patterns of lines or dots on the documents. Various types of specific Benday patterns are possible, to include sinusoidal waveform lines. Thus, in one embodiment the optical pattern can be generated with sinusoidal lines that embody a periodic function, and which produce shaded Benday background areas on the document to be protected. It should be noted that other periodic functions and different applications can be employed with similar results.

Figure 1A:
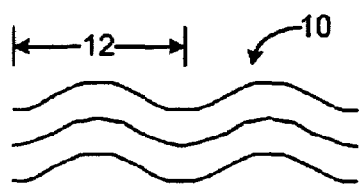
FIG. 1A is a series of stacked sinusoidal lines that form a Benday pattern.
Figure 1B:
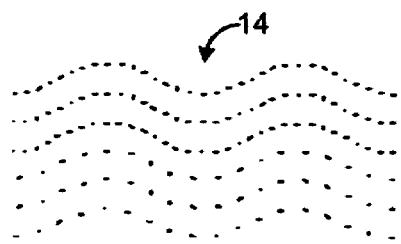
FIG. 1B is a series of stacked, segmented sinusoidal lines that form a Benday pattern.

Examples of sinusoidal Benday patterns are shown in FIGS. 1A–1B. Both wavelength and amplitude can be used as part of a sine wave Benday pattern, thus forming two levels of identity. And in order to embed the sine wave over a large area and at the same time add more distinctiveness, multiple in-phase sine waves can be stacked as shown in the array 10 of sinusoidal lines in FIG. 1A. The lines have wavelength 12 and thus capture of the specific data comprising the wave and computation will yield a consistent mathematical value. It should be noted that the optical signature need not be restricted to only geometric or trigonometric patterns.

A third level of identity can be added to the Benday pattern by varying the spacing between the stacked sine waves, and a fourth level of identity can be added to by breaking up the composition of the sine wave into a series of line segments with spacing and size becoming variables rather than a single continuous line. FIG. 1B illustrates an array 14 of spaced apart and segmented sinusoidal lines that can comprise a Benday pattern. Moreover, various sine waves can overlap or intersect at various angles, and the phase relationship of various waveforms and the cycles within a single waveform can all be varied with their mathematical value determined by viewing them. Accordingly, through printing sine waves in the background of a document and specifying each of the above parameters (i.e., amplitude, wavelength, stack spacing, phase, and line segmenting) a unique optical signature becomes a part of the document.

Figure 2B:
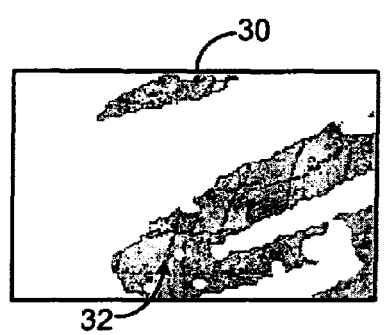
FIG. 2B is a picture of the scratch-off lottery ticket of FIG. 2A with filtering of all objects larger than the Benday pattern.

An example of the use of Benday patterns in the validation of scratch-off lottery tickets is shown in FIGS. 2A–2F. FIG. 2A shows a scratch-off lottery ticket 20 with a Benday pattern 22 printed on the document under the scratch-off layer 24 and a method for capturing the Benday pattern and authenticating the lottery ticket 20. The image of the scratch-off lottery ticket 20 is digitized as shown in FIG. 2B, and then applied to various digital processing techniques to extract the embedded optical signature for validation. Optical scanning equipment as is known in the art, such as image capture CCDs and cameras, can be used to capture the initial picture of the scratch-off lottery ticket 20.

Figure 2C:
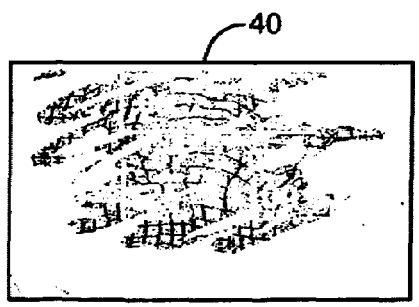
FIG. 2C is a picture of filtering eliminating the background of the scratch-off lottery ticket of FIG. 2B by keying on the color difference between the Benday pattern and the substrate.
Figure 2D:
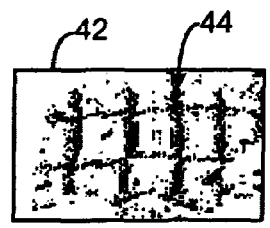
FIG. 2D is magnified view of the filtered Benday pattern of FIG. 2C.

In FIG. 2B, the image 30 is first digitally filtered by eliminating all objects in the scanned image that are larger than the expected size of the optical pattern pixels 32 or dots. Then, as shown in FIG. 2C, the next filtering eliminates the background by keying on the color difference between the optical pattern and the substrate shown in picture 40. Then the optical pattern is magnified to the appropriate size, as shown in picture 42 in FIG. 2D, such the Benday pattern 44 can clearly be viewed and interpolated (if necessary). Finally, as shown in FIG. 2E, a mask 50 can be extracted from the validating device's memory to focus a comparison on the relevant portion of the scratch-off lottery ticket 20. In one embodiment, the mask can be tied to other information on the lottery ticket 20, such as a UPC barcode or other serial number on an instant ticket.

In the disclosed embodiment, a one-to-one relationship between the scanned optical pixels 52 and the mask pixels 54 is assumed as shown in FIG. 2F, and the scanned image 54 is oriented the same way as the digital mask such that the two can be virtually overlaid on top of each other. The number of scanned image pixels 52 that fall inside and outside of the overlaid mask pixels 54 determined how closely the scanned optical pattern matches the a priori mask. Accordingly, a large number of image pixels 52 outside the mask pixels 54 with a small number of pixels inside would constitute a failure, and the converse being a successful validation. Alternately, the inverse of the above technique can be used, i.e. an inverse mask can be used such that the number of pixels that fall inside the mask can be the pixels that contain the data of interest.

As can be seen from FIG. 2A–2F, the present invention is particularly advantageous in use under the scratch-off layer 24 of a scratch-off lottery ticket 20. This allows any area removed by the player to be subjected to embedded optical signature validation. And for added security, the optical signature validation data can then be compared to the lottery ticket's barcode data (typically printed on the back of the ticket) allowing the lottery ticket to be validated without any added scratch-off medium removal. Furthermore, the scanning equipment required for optical signature validation is inexpensive, requiring, in this embodiment, a Video Graphics Array (VGA) with optical capabilities of 16 colors at 640×480 pixel resolution.

In another embodiment where lottery tickets are vended through remote sales, and thus "on-line," a reduced-labor alternative method of validation is to maintain a virtual ticket serial number in the vending terminal's memory (not shown) that is issuing the on-line lottery ticket. The virtual ticket serial number can be based upon a pseudorandom starting value that was passed encrypted to the Lottery entity at the start of the day. Whenever an on-line lottery ticket is issued, the virtual ticket serial number would increment either by a unit or pseudo randomly via a Linear Congruential Generator (LCG). These generators use a method similar to folding schemes in chaotic maps. For reference, the general formula is:

$$l_k = (al_{k-1} + c) \bmod m$$

The values a, c and m are pre-selected constants: a is known as the multiplier, c is the increment, and m is the modulus. The resulting virtual ticket number would then be used to generate an optical signature pattern that would be printed real-time in the background of the on-line lottery ticket. To the player or retailer this optical signature would appear to be gray shading, but when a winning ticket was presented for optical scanning of its barcode, an optical scanner can detect the optical signature in addition to the barcode and be able to automatically correlate the two at the time of redemption.

Another use of the present invention is copyright protection or proof of copying of images. Through embedding an optical signature in the background of an image, any illegal copies would contain the optical signature as well as the image. A sufficiently large number of pseudorandom optical patterns are possible in the same document, and moreover, and the optical signature can be embedded in images in a manner not detectable by a human observer. Therefore, it would be very difficult to remove the optical signatures from the optically signed original document.

Another embodiment of the optical pattern for the optical signature is using a "star field" technique. As shown in FIG. 3 on substrate 60, the optical signature is created by placing a large number of stars 62 (or dots) in the background of a document. These background stars 62 can be digitally isolated from the rest of a scanned image with the trigonometric and/or geometric relationships between the various stars becoming the salient mathematical parameter of the optical signature. The knowledge of the spatial relationship of the stars 62 in the background of the document is then stored in an a priori database for validation.

The background stars 62 can be automatically created by a star field generator that pseudo-randomly places the stars on an image under specified geometric constraints and multiple star fields (with the same geometric constraints) can be tiled next to each other providing coverage for large image areas. Through varying the angles between the stars 62 and the associated distances, millions of different optical patterns are possible. FIG. 3 shows triangular star patterns which are created by a pseudorandom star field generator.

In one embodiment, the background stars 62 are defined as any pixel with a surrounding high contrast halo approximately four pixels deep. This high contrast ratio between a star and its associated halo can be achieved through varying methodologies, e.g., color, intensity, least significant bit (for digital images), and the like. For example, in printed documents, a star can be a 240 dpi inkjet drop or a 120 dpi thermal printer dot with a background halo free of drops/dots.

As shown in FIG. 4, the star field 76 can be used in a scratch-off lottery ticket 70 under the scratch-off layer 72. The series of stars 78 will be obscured until a player scratches-off a portion 74 of the scratch-off layer 72 and then an adequate amount of the star field 76 is exposed such that image capture can allow the verification of the scratch-off lottery ticket. An inexpensive (e.g., Video Graphics Array—VGA) camera or linear sensor can be used to scan the scratch-off lottery ticket 70 printed document, and preferably, a one-to-one ratio between the printed stars 78 and the sensor's pixels are maintained. For a printed on-line lottery tickets, a Contact Image Sensor (CIS) may also be used to scan the ticket.

In one embodiment of the validation, one of the image's primary color channels (i.e., red, blue, or green) searches for any repeating star pattern 74. The selected color channel is then digitally filtered by eliminating all objects in the scanned image that are larger than the expected stars, as shown with respect to the Benday pattern in FIG. 2B. In the disclosed embodiment, the triangular star patterns are digitally normalized from the orientation of the document to the a priori database.

Once the stars have been detected and oriented correctly, the relative distance and angles between the stars are measured and calculated. These measurements are the optical signature with their trigonometric and/or geometric values applied to an a priori database for validation. The spacing of the actual stars 78 should be such that any significant removal of the scratch-off covering 72 will reveal an adequate amount of stars 78 for validation to be possible.

The present invention can also be implemented in a monochromatic manner. In monochrome, the pixels are represented as either a "0" or an "1". A monochrome method presents special problems in that a single star overlapping two sensor pixels could be interpreted as two or more individual stars clustered together. To compound this problem, the moiré nature of the scans can cause different portions of the same ticket to exhibit different star morphing effects. Consequently, due to the "hit or miss" nature and the distribution of the star codes across a document, it is difficult to isolate and locate an individual star using a monochromatic scanner. It is known to use a "gray scale" to remove a background halo from a scanned pixel by utilizing the differerices in intensity of gray scale, i.e. the darker pixel is assumed to be a dot and lighter pixels are not.

Figures 5A, 5B:
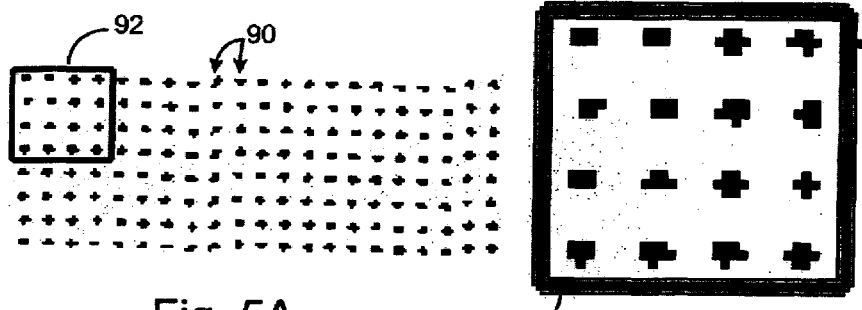
FIG. 5A is an exemplary scan of a star-field from a document.
FIG. 5B is a close-up grouping of stars from the scan of FIG. 5A.

For use in a monochromatic setting, the present invention can utilize a "pseudo gray scale" in monochromatic scans of a document containing a star-field optical pattern to both isolate and locate printed stars. Here, a "star" can be a printed dot or number of dots. Given that each dot or pixel is printed as a circle, the expected shape to be scanned in a monochromatic bitmap is also a circle. However, for various reasons the printed circle typically bleeds beyond its normal one pixel radius on its substrate, for example a thermal printer wherein the heat from the print head causes the printed dot to occupy a larger area than the imager head. To compound the problem, the alignment of the printed circles to the scanner's sense pixels is rarely ideal, also resulting in different shaped scanned pixels. For example, FIG. 5A illustrates typical scans of printed 200 dpi stars on an actual terminal. This set of scanned pixels is far from ideal and the specific location of a given star is ambiguous. A grouping of 5×5 pixels can be arbitrarily made, as is shown in FIG. 5B, which is a grouping from the pixels of FIG. 5A.

Figures 6A, 6B, 6C:
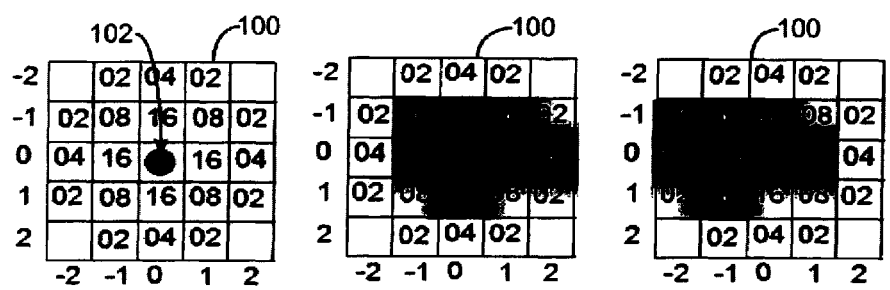
FIG. 6A is a grid of weighted pixel values that can be overlaid upon a star.
FIG. 6B is the grid of FIG. 6A overlaid on a scanned image of a star.
FIG. 6C is the grid of FIG. 6B shifted in position over the scanned star.

As shown in FIGS. 6A–6C, if the scanned pixels from a given star, such as grouping 92, were overlaid on a grid 10, with the center of the grid coinciding with the theoretical center 102 of the star, one can identify the true center as well as the intensity of the star. As illustrated in FIG. 6A, the pixels immediately surrounding the center 102 of the grid are given higher weighting values; The center 102 of the grid 100 carries a weighting factor of "17" with the pixels orthogonally oriented to center receiving the highest surrounding value of "16" and the pixels diagonally oriented, i.e. upper right, upper left, lower right, and lower left, the lower value of "8". This process is repeated with the next outer layer of pixels with the orthogonal and diagonal pixels receiving lesser weightings, i.e., "4" and "2" respectively.

When the grid 100 illustrated in FIG. 6A is overlaid onto a scanned star, the weighting factors are calculated to produce a pseudo grayscale for each pixel as well as the star's overall weight. For example, in FIG. 6B, the center illustration in FIG. 6A is shown with a star where all four of the immediate orthogonal values are weighed, along with two of the immediate diagonal values, as well as one of the outer orthogonal values resulting in an overall star weighing of: 17+16+16+16+16+8+8+4=101

Thus, the star in the center illustration would receive an overall gray weighting value of "101" with the individual pixels carrying weights of "17, 16, 8, and 4". When the grid 100 is shifted to the right, as shown in FIG. 6C, the scanned star in this example receives an overall value of "87": from 17+16+16+16+8+8+4+2.

Accordingly, this embodiment uses the overall pseudo grayscale weighting values to differentiate individual stars from background noise. The pseudo grayscale weighting of an individual scanned pixel receives its own grayscale value based on the weighting factor grid. The higher the value assigned to a given scanned pixel, the darker the pseudo grayscale. Through such pixel weighting an excellent representation of the location of each star can be achieved.

The same grid 100 that is used to define a star also eliminates what is not a star. If every location of the grid illustrated in FIG. 6A were filled, the multi-pixel star would receive a value of "145." No true star should ever be able to fill the entire grid, so any pixel having a value of 145 can be eliminated for being too dark. By observing several scans of printed tickets, a tuning level can be achieved that effectively eliminates background noise (e.g., printed text on a ticket) and only allows the actual stars of the star-field to be forwarded for processing.

Figures 7A, 7B:
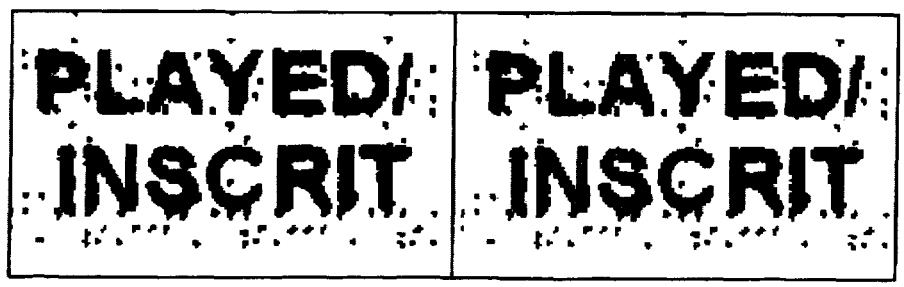
FIG. 7A is an illustration of a monochromatic scanned image with human readable text as noise and a star field in the background.
FIG. 7B is the same image as FIG. 7A with all overall pseudo grayscale candidate stars with a weighting value greater than 72 highlighted in color.

For example, FIG. 7A provides an illustration of a monochromatic scanned image with human readable text as noise and a star field in the background. FIG. 7B is the same image as FIG. 7A with all overall pseudo grayscale candidate stars with a weighting value greater than 72 highlighted in color. Thus, any bitmap image other than black would be eliminated from the bitmap, leaving only the true stars of the star-field.

To measure the geometrical relationship between stars, one must find the center of the star independent of printing faults and scanner pixel misalignments, and by utilizing the aforementioned pseudo grayscale for pixels the center of the star would be represented as the darkest pixel(s), i.e., any pixel in a grid that does not have the darkest pseudo grayscale value can be safely eliminated. Thus, a grid of stars 110 in raw data form can be scanned as shown in FIG. 8A, and when the methodology of eliminating all but the darkest pixel(s) in a given grid is applied to the scanned pixels, the background pixel noise is reduced resulting in the image illustrated in FIG. 8B.

Figures 8A, 8B, 8C:
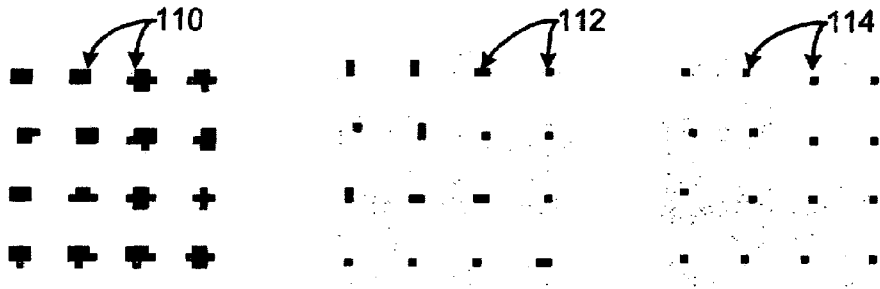
FIG. 8A is a grid of stars scanned in raw-image form.
FIG. 8B is the grid of stars of FIG. 8A with only the darkest of the pixels illustrated.
FIG. 8C is the final filtered pixels of the grid of stars of FIGS. 8A and 8B.

FIG. 8B shows only the darkest of the pixels 112 in each star. In some cases this eliminated all but one pixel, but in others there are two or three pixels remaining after the filtering process. At this point it becomes a simple matter to choose one of the equal pixels and discard the rest resulting in the final filtered single star pixels 114 of FIG. 8C.

In another embodiment, the present invention method of using an embedded star-field can use the concept of different shaped blocks to build a data matrix (a "galaxy") that occupies only the available background areas (such as white space) of a document, such as an on-line lottery ticket. It should be noted that this embodiment can be used with the pseudo gray scale methodology described above to align the stars properly. In this embodiment, the "shaped" stars can completely fill a fixed area using predefined pieces. In particular with on-line lottery tickets, the present method can use whatever shaped background area (white space) is available to squeeze as much data as practical on the ticket.

Figure 9:
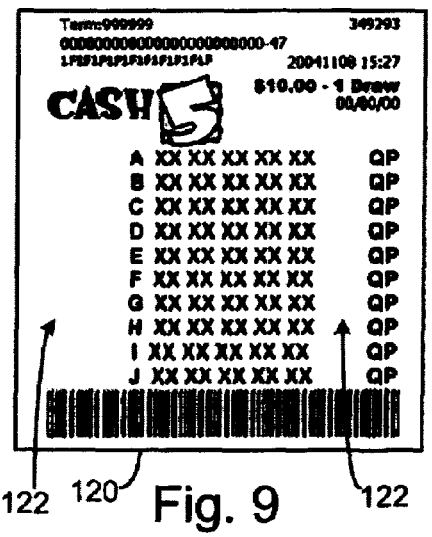
FIG. 9 is an exemplary printed on-line lottery ticket.

An exemplary printed on-line lottery ticket 120 is shown in FIG. 9. As can be seen, on-line lottery tickets tend to print data in groups of information that usually leaves sufficient white space 122 for multiple "galaxies of redundant data" that comprise an optical pattern. Thus, as shown in the modified lottery ticket of FIG. 10, multiple galaxies 126 of stars can be printed in the otherwise unused white space. Because of the odd layout of the white space, the stars can assume odd shapes when filling in the star field.

Figure 10:
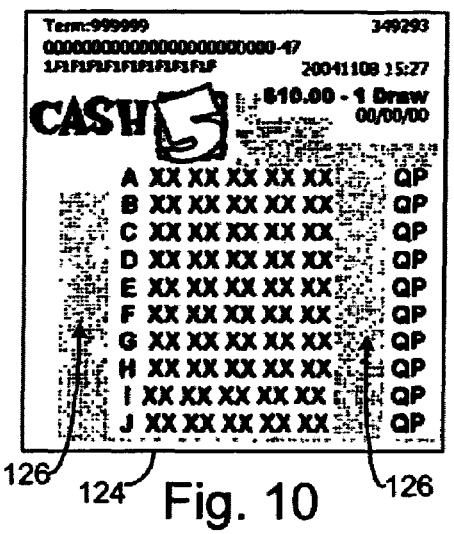
FIG. 10 is a printed on-line lottery ticket with the background modified with star-field data comprising an optical pattern.
Figure 11:
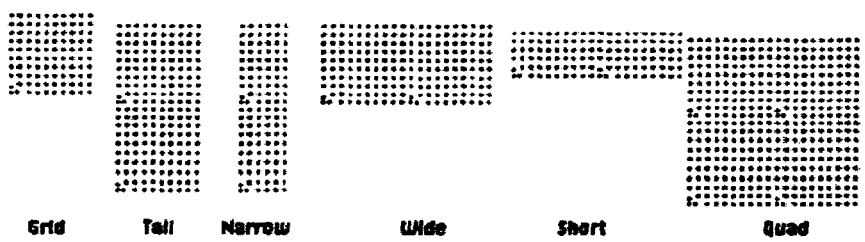
FIG. 11 is a predefined set of pieces or blocks of stars that can be used to tile background areas of a document.
Figure 12:
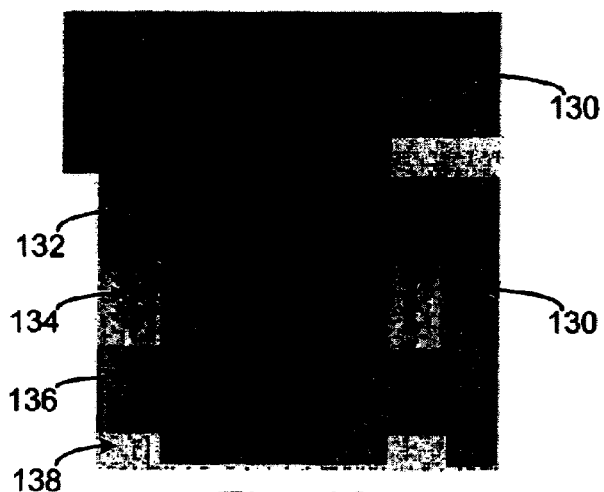
FIG. 12 is the lottery ticket of FIG. 10 with the various star-field blocks highlighted from the background area.

A predefined set of pieces or blocks, such as those shown in FIG. 11, can be used to tile the open areas (white space) of the on-line lottery ticket, such as shown in FIG. 10. The utilization of these blocks the star fields on the lottery ticket of FIG. 10 are highlighted to show the star-fields in FIG. 12. In FIG. 12, it can be seen that one of the primary aspects that differentiates the star codes from a traditional one or two-dimensional barcode is that the star-field can be modified in shape to fit within the available background area of a ticket rather than require a reserved space for a fixed rectangle or square, as is necessary in extant bar codes. In FIG. 12, red areas 130 denote keep-out zones of the lottery ticket. Other color zones, purple 132, blue 134, green 136 and yellow 138 denote different fields of data for data input and capture.

These areas can be enlarged or shrunk, and can be interlinked in virtually any manner.

In particular regard to the detection of orientation of the blocks, or shaped-stars, the method first establishes a reference point by searching the scanned "universe" of one or more star-fields for "guide stars." Once a set of three guide stars is identified, the information in the associated guide cluster is decoded to determine the orientation and configuration of the "galaxy," or the particular star-field of data. There are preferably redundant guide stars and galaxies, and consequently, the "universe" of all star-fields can continue to be scanned for other (redundant) guide stars and galaxies until the data is successfully decoded or all guide stars in the universe are exhausted. It should also be noted that guide stars are not exclusive to the block methodology as one can use guide stars in the other embodiments to determine star orientation or to pass other key information to the scanner.

Regarding the scale of data, the "star" is the most fundamental unit that can be utilized to encode data in a binary sense, i.e. 0 or 1. A star can be represented as a single high-contrast pixel in the universe. However, one problem with single pixels representing stars, is that printers (especially ink jet and thermal) will routinely dropout single pixels, which can void an entire block of data in the present system. A better alternative is to a priori classify a star to be a predefined grouping of pixels such that a dropout of any one pixel will not impact the ability to decode the data. Additionally, a grouping of pixels defining a star can help allow the system and method to discriminate against background noise. In one embodiment, an arrangement of five printed pixels in a plus sign (+) configuration provides a highly reliable star grouping with minimal use of space. With plus sign groupings, the dropout of any three pixels will still allow the accurate determination of the intended center of the star.

Figure 13:
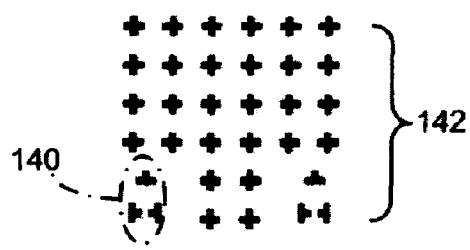
FIG. 13 illustrates a guide star with a guide cluster star-field.

FIG. 13 illustrates a guide star 140 (highlighted in red and gray) in the lower left-hand corner of a partial guide cluster 142. The guide star 140 differs from the regular data stars (each shaped as a plus sign "+") to allow the ready differentiation of a guide star 140 from a data star as well as determine the orientation (i.e., rotation) of the cluster 142 or data set of stars. The top part of the guide star 140 (red highlight) identifies the normal orientation of the universe, i.e., which direction is the top of the universe as originally imaged. Since the star field images can be scanned in any rotation, the guide stars pointing to the top of the universe allow the scanned image to be oriented to the a priori universe properly.

Figure 14:
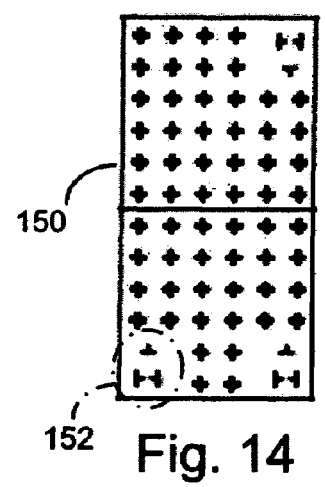
FIG. 14 is a guide cluster of stars, with three corners of the guide cluster identified by guide stars.

In one embodiment, the guide stars are always imaged in sets of three; identifying three corners of a guide cluster 150, such as shown in FIG. 14. The guide cluster 150 holds information on how a galaxy is configured. The galaxy always orbits its guide cluster and, in this embodiment, can be comprised of up to eighteen different blocks of stars, as shown in FIG. 11. The information contained in the guide cluster 150 describes the configuration of the galaxy or complete set of data which is important to determine as the arrangement of the blocks will automatically vary from the available white space from ticket-to-ticket.

In one embodiment, in addition to describing the configuration of the galaxy's orbit, there are also Hamming code error correction stars included in the guide cluster 150 to compensate for any noise or dropouts in the scanned image. Hamming codes for error correction are well known in the art and require the use of a small number of stars. A Hamming code is an error-detecting/error-correcting system, used in data transmission, which can: (a) detect all single- and double-bit errors and (b) correct all single-bit errors. Here, the inclusion of certain stars will be added to other stars for at least simple parity, and alternately, combination to a Hamming code word, as is known the art.

Figure 15:
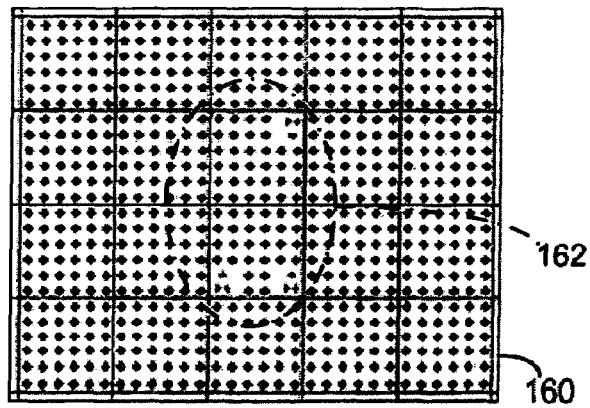
FIG. 15 illustrates a star-filed galaxy comprised of a set of blocks grouped around a guide cluster of stars.

A star-field galaxy contains a complete set of data. There is always one galaxy per guide cluster, with the associated galaxy orbiting its guide cluster 162, as shown in the "star galaxy" 160 of FIG. 15. Each galaxy is comprised of a variable number of blocks depending on the shape of the available white space, the amount of data encoded, and the level of error correction employed. In this level, Reed-Solomon error correction can be employed. It should be noted that the methodologies can be used in Tandem or separately, e.g. Hamming codes can be used for error correction for guide clusters and Reed-Solomon for error correction in galaxies. Reed-Solomon error correction is a coding scheme, which works by first constructing a polynomial from the data symbols to be transmitted and then sending an over-sampled plot of the polynomial instead of the original symbols. Because of the redundant information contained in the over-sampled data, it is possible to reconstruct the original polynomial, and thus, the data symbols even in the face of transmission errors, up to a certain degree of error.

Figure 16A:
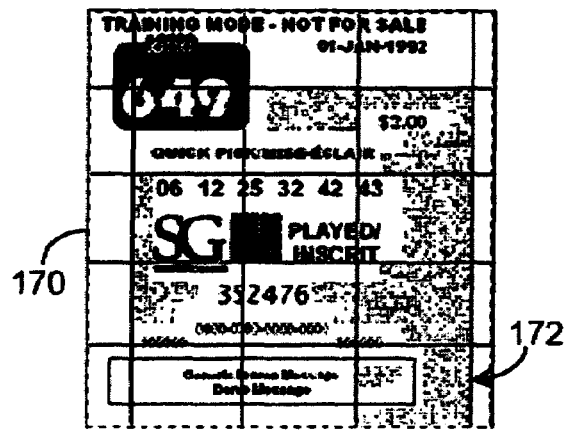
FIG. 16A is an exemplary printed on-line lottery ticket with a star-field universe in the background and a reference grid overlaid thereupon.
Figure 16B:
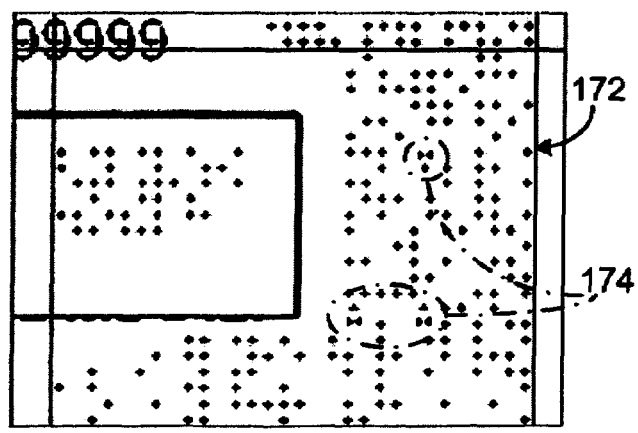
FIG. 16B is a grid of stars from the lottery ticket of FIG. 16A with several guide stars illustrated.

Multiple galaxies 172 are clustered together on a single scanned image to comprise an universe as shown in the optical pattern of the on-line printed lottery ticket 170 in FIG. 16A. These multiple galaxies 172 allow for full redundant data to be placed on an image wherever white space is available. Since each galaxy is defined by its associated guide cluster 174, only one galaxy need be decoded for all of the data to be recovered, such as the galaxy with guide cluster 174 shown in FIG. 16B. Thus, the present invention achieves a very high level of reliability through independent data sets (a.k.a. star-field galaxies) with their own error correction with the added redundancy of multiple data sets.

It should be noted that while the disclosed embodiments of the optical signature can be encoded from a random mathematical value, other identification codes embedded on the substrate, such as UPC codes on Lottery tickets, can be used to generate the optical signature or used in validation of the document. Thus, the optical pattern can then be encoded from a mathematical value based upon only or partially on the identification code. Furthermore, the optical pattern can be readily visible to a viewer, such as the Benday pattern shown in FIG. 1–2F, or can be invisible to a viewer, such as printed in ink only viewable to a certain wavelength of light, such as ultraviolet light.

It can thus be seen that the present invention provides, in one aspect, a method for validating/authenticating a document, such as scratch-off lottery ticket 20, having an embedded optical signature, such as Benday pattern 22 or star field 76. The method includes the steps of examining an optical pattern on the document, such as shown in FIGS. 2A–2F, wherein the optical pattern encodes a stored mathematical value, then generating a mathematical value from the optical pattern on the document, retrieving a stored mathematical value (from the a priori database), and comparing the stored mathematical value with the generated mathematical value from the optical pattern on the document, as is shown in FIG. 2F, to determine if the mathematical values are the same thereby indicating the document is valid/authentic.

As described above, if the optical pattern encodes a mathematical value based upon an identification code embedded on the document, such as a UPC code on a lottery ticket 20, then the method further includes the steps of examining the identification code on the document; and then generating a mathematical value from the optical pattern and the identification code. Dependent upon the embodiment, the step of examining an optical pattern can be examining either a visible or invisible optical pattern.

While the foregoing disclosure shows illustrative embodiments of the invention, it should be noted that various changes and modifications could be made herein without departing from the scope of the invention as defined by the appended claims. Furthermore, although elements of the invention may be described or claimed in the singular, the plural is contemplated unless limitation to the singular is explicitly stated.

What is claimed is:

1. A method of embedding an optical signature on a substrate, comprising the steps of:
   obtaining a value;
   generating an optical pattern which encodes the value;
   embedding the optical pattern on within a background of the substrate such that the value is interpretable after the optical pattern is filtered from the background of the substrate;
   generating an identification code;
   generating a mathematical value based upon the identification code; and
   embedding the identification code on the substrate.

2. A method of embedding an optical signature on a substrate, comprising the steps of:
   obtaining a value;
   generating an optical pattern which encodes the value;
   embedding the optical pattern on within a background of the substrate, such that the value is interpretable after the optical pattern is filtered from the background of the substrate;
   generating an identification code;
   generating a mathematical value based upon an encryption of the identification code; and
   embedding the identification code on the substrate.

3. A method of validating a document having an embedded optical signature on a background of the document, comprising the steps of:
   filtering an optical pattern from the background of the document, the optical pattern encoding a stored value;
   generating a value from the optical pattern on the document;
   retrieving a stored value;
   comparing the stored value with the generated value from the optical pattern on the document to determine if the values are the same thereby indicating the document is valid, wherein the optical pattern encodes a stored value based upon an identification code embedded on the document, and the method further comprising the steps of:
   examining the identification code on the document;
   generating a mathematical value from the optical pattern and the identification code; and
   comparing the embedded value with the generated value from the optical pattern on the document to determine if the values are the same thereby indicating the document is valid.

4. A document having an embedded optical signature, comprising:
   a substrate with a background;
   a detectable optical pattern embedded on the background of the substrate, the optical pattern encoding a value; and an identification code embedded on the substrate, wherein the optical pattern is encoded from a mathematical value based upon the identification code.

5. A method of embedding an optical signature on a scratch-off lottery ticket, comprising the steps of:

obtaining a value;

generating an optical pattern which encodes the value; and embedding the optical pattern on the scratch-off lottery ticket such that the value is interpretable after the optical pattern is filtered from the background of the scratch-off lottery ticket, wherein the embedded optical pattern equating to a number algorithmically related to a barcode on the scratch-off lottery ticket.

6. A method of embedding an optical signature on a scratch-off lottery ticket, comprising the steps of:

obtaining a value;

generating an optical pattern which encodes the value;

embedding the optical pattern on the scratch-off lottery ticket such that the value is interpretable after the optical pattern is filtered from the background of the scratch-off lottery ticket;

placing a removable coating over the embedded optical pattern on the scratch-off lottery ticket;

generating a second optical pattern; and embedding the second optical pattern on the removable coating, wherein the second optical pattern indicating whether the scratch-off lottery ticket has been played.

* * * * *